Feb. 2, 1943.  C. WALDEYER  2,310,047
PROJECTION APPARATUS
Filed April 4, 1941
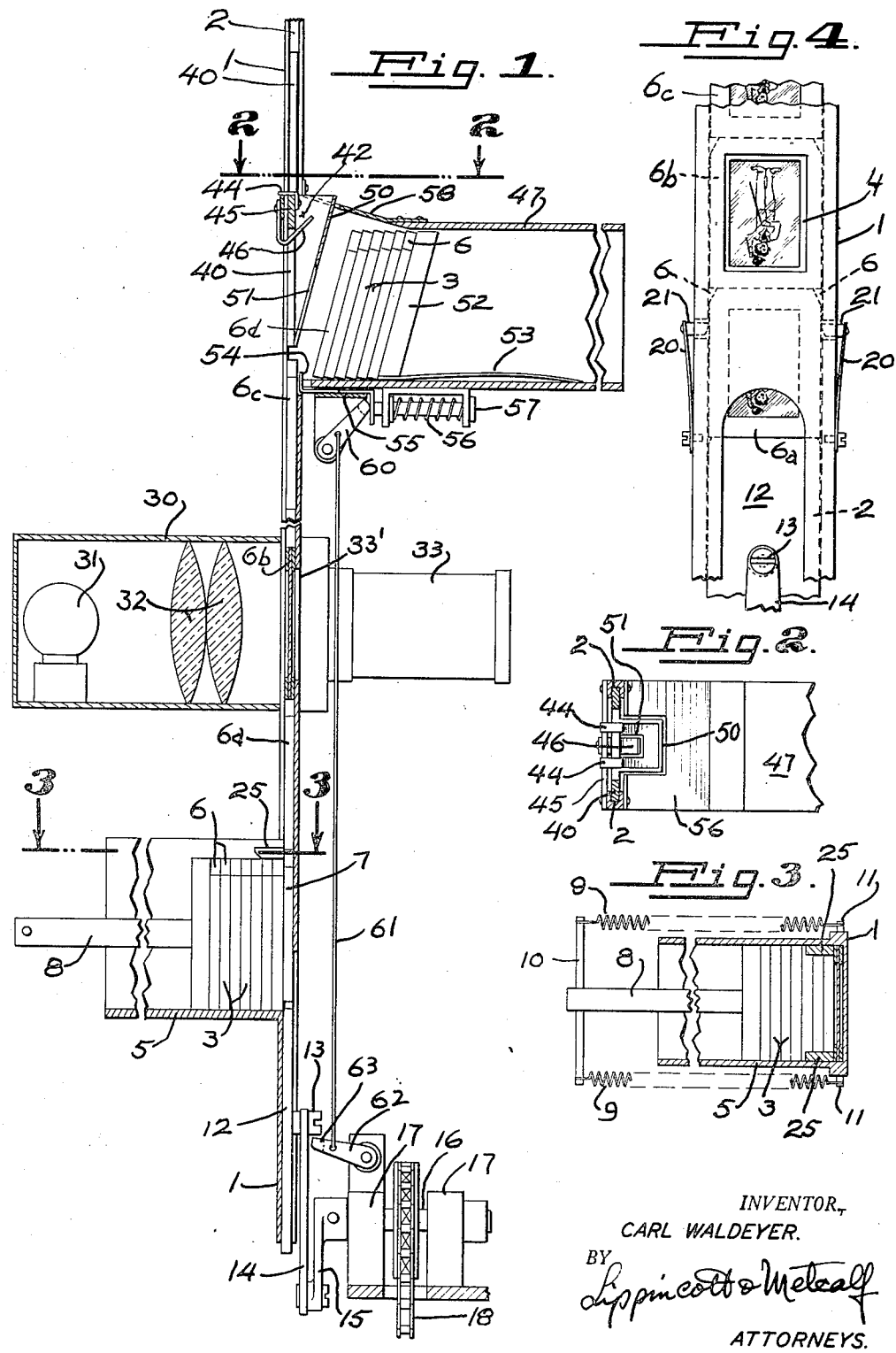
INVENTOR,
CARL WALDEYER.
BY
Lippincott & Metcalf
ATTORNEYS.

Patented Feb. 2, 1943

2,310,047

UNITED STATES PATENT OFFICE 2,310,047

PROJECTION APPARATUS

Carl Waldeyer, San Francisco, Calif.

Application April 4, 1941, Serial No. 386,809

7 Claims. (Cl. 88—28)

My invention relates to means for sequentially presenting pictures or images to a projecting device, and more particularly to a device which will present separate slides for projection at either high or low speeds, and which will take such slides from a stack and restack them in proper position to be re-used.

Among the objects of my invention are:

To provide a device for sequentially presenting a succession of image carrying slides to a projection device; to provide a means for taking separate slides from a stack, projecting them in sequence, and restacking them in order; to provide a device which will automatically supply successive separate slides to a projection device at desired speed; and to provide a simple and efficient automatic projector for a series of framed images.

Other objects of my invention will be apparent or will be specifically pointed out in the description forming a part of this specification, but I do not limit myself to the embodiment of the invention herein described, as various forms may be adopted within the scope of the claims.

My present invention is ideally adapted to be used in conjunction with the projection machine shown, described, and claimed in my prior application Serial No. 299,628, filed October 16, 1939.

In the drawing:

Figure 1 is a view partly in vertical section and partly in elevation, showing one preferred form of my device, the optical system being diagrammatically shown.

Figure 2 is an elevational view taken as indicated by the line 2—2 in Figure 1.

Figure 3 is a view partly in section and partly in elevation taken as indicated by the line 3—3 in Figure 1.

Figure 4 is a front view of the feeding portion of Figure 1.

My invention may be more fully understood by direct reference to the drawing. A vertical guideway 1 is provided, having opposed internal grooves 2 therein, the grooves being shaped to guide image slides 3. These image slides may be projection prints, drawings on translucent or transparent material, or opaque photographs, mounted in a frame 4 of metal, Bakelite, or similar hard material. The images in the various frames may be, if desired, in sequence to provide a motion picture when rapidly and sequentially projected in combination with a shutter, or may be entirely independent views which can be projected separately and left on the screen for any length of time desired.

A feed magazine 5 is provided in which slides 3 are horizontally stacked, each in vertical position. Each frame 4 is provided with a top bevel 6 on each side thereof. Feed magazine 5 is horizontally mounted at the rear of guideway 1, adjacent a rear opening 7 in the guideway, so that the slides may enter the guideway and become vertically alined with grooves 2 therein. The stack of slides 3 is forced against guideway 1 by a plunger 8 operated by springs 9 attached to cross bar 10 at one end, and to pins 11 at the guideway end of feed magazine 5.

Immediately below magazine 5 is a feed plate 12 having a pivot pin 13, reciprocated in grooves 2 by rod 14 connecting pin 13 and crank 15. Crank 15 is attached to shaft 16 mounted in bearings 17. Shaft 16 may be rotated in any convenient manner as, for example, by chain 18 driven by any convenient source of power.

Immediately above opening 7 in guideway 1 are positioned opposed slide springs 20—20 having friction pins 21 thereon passing through the edges of guideway 1 to bear against opposite edges of any slide forced upwardly in guideway 1 above the level of stacked slides 3. The stroke of feed plate 12 is arranged to force the first slide only of the stack upwardly a sufficient distance to just clear the remaining slides, so that after feed plate 12 returns to its lowest position the next slide will be forced into aperture 7 by springs 9 and plunger 8. Thus continued reciprocation of feed plate 12 forces a succession of slides upwardly, one above the other and in contact with each other. As each slide passes upwardly from the stack, bevels 6 engage friction pins 21 and force them outwardly against the tension of springs 20 to hold the slide just above the stack firmly in position, so that on the return stroke of plate 12 all of the slides in the guideway 1 will remain in position. In order that feed plate 12 may not force more than one slide upwardly at a time, edge dogs 25 are provided on each side of the feed magazine 5 bearing against the top of the second slide in the stack so that this second slide cannot be moved upwardly.

As the slides are pushed upwardly and come to rest at the top of the stroke of plate 12, light is projected through one of the frames in the guideway 1. In Fig. 1 I have shown the second slide in the guideway in position 6b, for projection. On one side thereof is a lamp housing 30 having therein a projection lamp 31 and the customary condensing lenses 32 on one side of the slide. A projection lens 33 is mounted on the other side, all being conventionally illustrated. The guideway is cut away to form a projection aperture 33'. Thus during the return of feed plate 12 to pick up a new slide and force it upwardly, the image from the slide in position 6b in the path of light from lamp 31 may be projected on a screen.

After the projection has taken place, the slide which has just been projected is pushed upwardly by the movement of slides below, and comes to rest in position 6c between the projection system and a restacking device which is at the top of the guideway. On the next reciprocation of plate 12 the slide in position 6c will pass into the restacking device, as will be later explained.

Thus there may be, between the projection aperture and the stacked slides being fed upwardly, one or more slides in the guideway, and between the projection aperture and the restacking device there may also be one or more slides, preferably one in each instance.

As a slide is projected upwardly into the level of the stacking device, its upper edge first contacts the bottom of a sliding plate 40. Sliding plate 40 is free to slide in grooves 2 of guideway above an outlet opening 42, and is held from dropping below outlet opening 42 by brackets 44 resting on a fixed cross bar 45 connecting the two sides of guideway, as shown in Fig. 2. Fixed cross bar 45 also carries a stationary slide tilting plate 46 extending forwardly and upwardly, to engage the upper end of a slide pushed against it, and to tilt the slide toward a horizontally positioned restacking magazine 47. Sliding plate 40 is also provided with forwardly and upwardly extending angular surface 50 having an aperture 51 therein through which tilting plate 46 may pass as the sliding plate 40 rises. Restacking magazine 47 is provided with a backing bar 52 held in place by slidable base 53, this backing plate 52 being on a slight angle, preferably parallel to angular surface 50.

At the bottom of restacking magazine 47 adjacent outlet aperture 42 I position a stacking lug 54 projecting into the interior of magazine 47 a sufficient distance to engage the bottom of the last slide 6 deposited therein. This lug slides in a guide 55 and is maintained in position by spring 56 and end stop 57, this position being just forward of and level with the top of a slide in position 6c still in the guideway 1 and ready to be stacked on its next upward movement. Lug 54 is reciprocated by a cam 60 actuated by a pull rod 61 which is attached to a pivoted arm 62 mounted on one bearing 17, the end 63 of arm 62 being in the path of connecting rod pivot 13 so that at the end of the stroke of plate 12, arm 62 will be moved downwardly, causing the cam 60 to move lug 54 toward the interior of magazine 47 to move the restacked slides away from the guideway. Cover 58 on magazine 47 prevents the slides from being flipped out of the magazine.

Having described the construction of my invention, I will now describe its operation. The slides to be fed into the device are placed in proper order in feed magazine 5 with the beveled edges 6 up, piston 8 is put in place and springs 9 attached. The first reciprocation of feed plate 12 pushes the first slide 6 upwardly to position 6a, where it is frictionally held in place by pins 21. The second reciprocation of plate 12 pushes another slide out of the feed magazine 5 and the first slide into the projection aperture 33. The third stroke of plate 12 feeds another slide into the guideway and pushes the slide just projected to the position 6c between the optical system and the restacking device. The fourth reciprocation of plate 12 forces the first slide upwardly into the stacking apparatus. As this first slide reaches the stacking apparatus and travels upwardly, it at first carries sliding plate 40 upwardly with it until the lower edge of the slide being stacked reaches the level of the top of lug 54. Just prior to that time the top of the slide being stacked has contacted tilting plate 46 which diverts the top of the slide toward magazine 47. As soon as the top of the frame has been sufficiently diverted to prevent further support of plate 40, plate 40 falls by gravity, surface 50 flipping the slide into magazine 47, either against backing plate 52 or against previous slides already in the magazine 47. However, this last deposited slide leaves no room at the base of the magazine for the next slide. Lug 54, operating at the end of the stroke of slide plate 12, pushes the slide just deposited in magazine 47, to the position shown at 6d in Fig. 1, thus leaving room for the bottom of the next arriving slide between lug 54 and the last deposited slide. Thus the slides are automatically taken out of the feed magazine, projected, and deposited in proper order in the restacking magazine.

I have found that the arrangement I have described herein is capable of being operated at high speeds. By the use of a shutter in the optical system, for example, my invention can be utilized for projecting motion pictures from sequential slides. Or, without the use of a shutter, it can be utilized for projecting a series of still pictures.

I would also like to point out that while I have shown my device as being used for projection by means of light passing through a transparent or translucent image, it can also be used as is well known in the art, to project opaque images by reflection.

It will also be noticed that, by feeding the slides at the rear of the guideway and by restacking them at the front of the guideway, the restacked slides are in proper position as regards orientation to be reprojected if desired. Therefore, feed magazine 5 and restacking magazine 47 may be duplicates, and may be movably fastened to guideway 1, using opposite ends of the magazines to receive the frames and to feed the frames.

It will be obvious from the above description that the projection system of my present invention may be utilized in duplicate and with alternately loaded slides for the projection of motion pictures in the apparatus shown, described and claimed in my patent entitled "Motion picture projector," No. 2,266,833 of December 23, 1941.

I claim:

1. Means for sequentially feeding horizontally stacked image carrying slides to a projection device and restacking said slides in order after projection thereof, comprising a vertical guideway having opposed grooves therein, wherein said slides may move, a feed magazine on one side of said guideway for holding horizontally stacked slides, means for urging the slide at one end of said stack into said guideway in line with said grooves, a reciprocating member in said guideway for pushing each slide in line with said grooves upwardly to clear said stack, the stroke of said member downwardly being sufficient to allow the next slide in said stack to enter said guideway whereby continued reciprocation of said member forces a series of slides upwardly in said guideway, friction means extending into the grooves of the opposed vertical guideways for bearing against the opposite edges of a slide to hold the same in position for projection during the rest period between upward movements, an optical system positioned to project the image directly from each said series of slides between upward movements thereof at a predetermined position in said guideway, a horizontally positioned slide receiving magazine positioned on the other side of said guideway above said optical system, and means for forcing the top slide out of said guideway laterally into said receiving magazine in a position at a slight angle to the vertical.

2. Apparatus in accordance with claim 1 wherein said means for forcing said top slide laterally out of said guideway comprises a weight slidable upwardly in said guideway by contact with the top of said top slide, together with means positioned on said guideway to tilt the top of said slide toward said slide receiving magazine to remove the support from said weight, said weight while falling forcing said top slide out of said guideway into said magazine.

3. Apparatus in accordance with claim 1 wherein said means for forcing said top slide laterally of said guideway comprises a weight slidable upwardly in said guideway by contact with the top of said top slide, together with a member having an angular surface attached to said guideway in the path of said top slide to tilt said top slide toward said receiving magazine and to remove support of said weight by said slide, said weight while falling forcing said top slide out of said guideway into said magazine.

4. Apparatus in accordance with claim 1 wherein said means for forcing said top slide laterally out of said guideway comprises a weight slidable upwardly in said guideway by contact with the top of said top slide, together with a member having an angular surface attached to said guideway in the path of said top slide to tilt said top slide toward said receiving magazine and to remove support of said weight by said slide, said weight having an upwardly slanting surface thereon facing said receiving magazine to force said slide out of said guideway into said magazine while falling.

5. Apparatus in accordance with claim 1 wherein said means for forcing said top slide laterally out of said guideway comprises a weight slidable upwardly in said guideway by contact with the top of said top slide, together with a member having an angular surface attached to said guideway in the path of said top slide to tilt said top slide toward said receiving magazine and to remove support of said weight by said slide, said weight having an upwardly slanting surface thereon facing said receiving magazine to force said slide out of said guideway into said magazine while falling, and means for moving the base of the restacked slides away from said guideway a distance equal to the thickness of a slide after receipt of a slide in said receiving magazine.

6. Apparatus in accordance with claim 1 wherein said means for forcing said top slide laterally out of said guideway comprises a weight slidable upwardly in said guideway by contact with the top of said top slide, together with a member having an angular surface attached to said guideway in the path of said top slide to tilt said top slide toward said receiving magazine and to remove support of said weight by said slide, said weight having an upwardly slanting surface thereon facing said receiving magazine to force said slide out of said guideway into said magazine while falling, and means for moving the base of the restacked slides away from said guideway a distance equal to the thickness of a slide after receipt of a slide in said receiving magazine, said latter means being operated in synchronism with the reciprocation of said slide.

7. Apparatus in accordance with claim 1 wherein said means for forcing said top slide laterally out of said guideway comprises a weight slidable upwardly in said guideway by contact with the top of said top slide, together with a member having an angular surface attached to said guideway in the path of said top slide to tilt said top slide toward said receiving magazine and to remove support of said weight by said slide, said weight having an upwardly slanting surface thereon facing said receiving magazine to force said slide out of said guideway into said magazine while falling, and means for moving the base of the restacked slides away from said guideway a distance equal to the thickness of a slide after receipt of a slide in said receiving magazine, said latter means being operated in synchronism with the reciprocation of said slide, and at the bottom of the stroke thereof.

CARL WALDEYER.

CERTIFICATE OF CORRECTION.

Patent No. 2,310,047.  February 2, 1943.

CARL WALDEYER.

It is hereby certified that error appears in the printed specification of the above numbered patent requiring correction as follows: Page 3, first column, line 6, claim 1, for "optional" read --optical--; line 28, claim 3, after the word "laterally" insert --out--; and that the said Letters Patent should be read with this correction therein that the same may conform to the record of the case in the Patent Office.

Signed and sealed this 18th day of May, A. D. 1943.

Henry Van Arsdale,
Acting Commissioner of Patents.

(Seal)